Sept. 11, 1923.  R. HEINOLD  1,467,853
LEVEL INDICATING ARRANGEMENT
Filed March 6, 1923
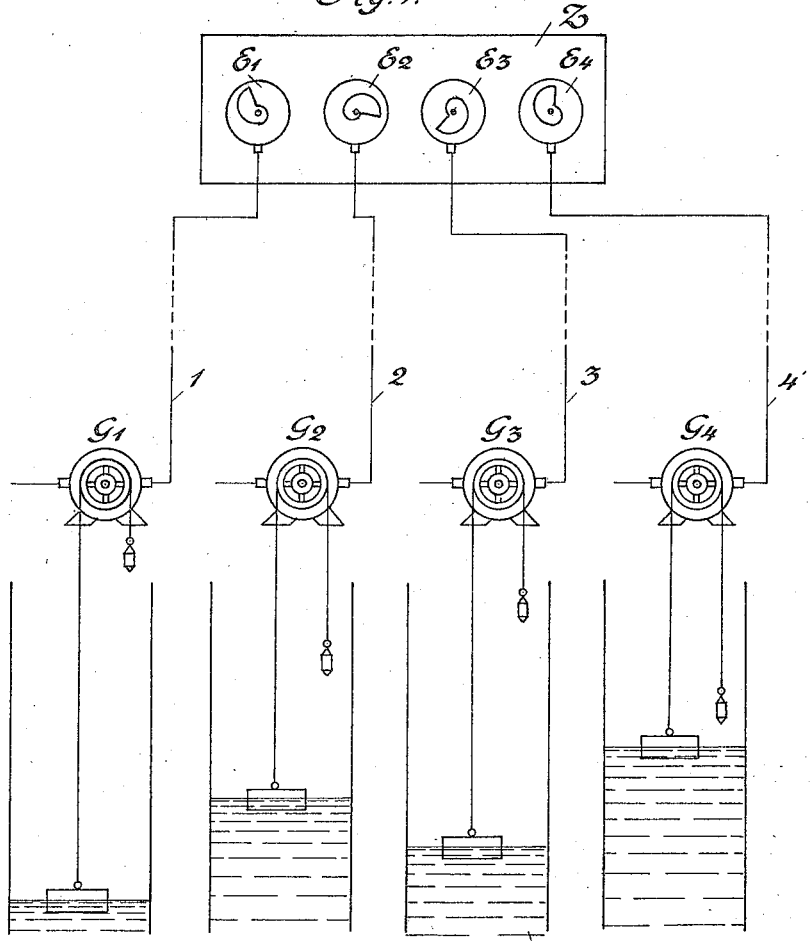
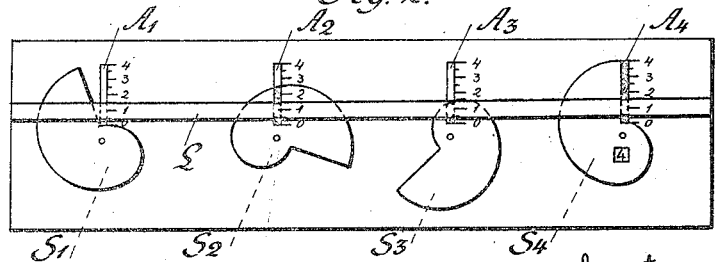
Inventor
Robert Heinold
by Knight Bro.
attorneys Patented Sept. 11, 1923.

1,467,853

UNITED STATES PATENT OFFICE.

ROBERT HEINOLD, OF KIEL, GERMANY.

LEVEL-INDICATING ARRANGEMENT.

Application filed March 6, 1923. Serial No. 623,241.

*To all whom it may concern:*

Be it known that I, ROBERT HEINOLD, citizen of the German Republic, and residing at Kiel, county of Schleswig-Holstein, State of Prussia, Germany, have invented certain new and useful Improvements in Level-Indicating Arrangements (for which I have filed application in Germany July 13, 1921), of which the following is a specification.

This invention relates to an arrangement for indicating at central position the levels of a number of bodies, such as water-surfaces, located at various distance spots. A separate transmitter and an associated receiver are used for each level to be indicated.

It frequently occurs, especially in large water power plants, that the water level in various channels shall be indicated at a central position, so as to enable the various levels to be readily compared and the measures involved to be properly carried out.

The object of this invention is to provide an efficient and conspicuous means of comparing the various levels so that they may be checked with the least possible trouble. The means employed by the invention for the transmission of the indications from the bodies or water surfaces to a central point consist of transmitters and receivers already used in known level indicators.

The invention consists in the indicating member of each of the receivers assembled at a central point being made in the form of a curved target or disk whose rotation is made to appear like a motion along a straight line in the direction of a slot or window. The curve of the disk may have the shape of an Archimedean or logarithmic spiral. The said slot, which may be provided with graduations for reading the different levels, will preferably extend in a vertical direction.

Assuming that the various slots for indicating the different levels extend in parallel directions it will be apparent that the different levels can thus be immediately observed and the indications can be made still more conspicuous by giving the disks a conspicuous colour. Thus, if the disks are made white, and the other parts of the arrangement black, the various levels will be distinctively indicated in the slots. In order to make the differences between two or more levels still more easily discernable a sliding rule may be provided which can be slided up and down along the slots.

The invention is shown in the drawing in which

Fig. 1 shows diagrammatically a water level indicating arrangement, comprising four distant control water level indicators of a known type.

Fig. 2 shows the face of the central indicator with the slots and the curved disks for operating therewith.

$G^1$, $G^2$—$G^3$ and $G^4$ are the transmitters which are turned in the one or other direction by means of a float, counterweight and rope slung over the pulleys of the instruments. The movements of the transmitters are transmitted by means of conductors 1 2—3 and 4 to the receivers $E^1$ $E^2$—$E^3$ and $E^4$. In accordance with the invention the receivers are combined in a casing or box Z whose face is shown on a larger scale in Fig. 2.

The face of the central instrument is provided with slots $A^1$ $A^2$—$A^3$ and $A^4$, one for each receiver and attached to the shafts of the receivers are curved disks $S^1$ $S^2$—$S^3$ and $S^4$ which are indicated in broken lines in Fig. 2. The axes of rotation of these disks, whose peripheries form Archimedean or logarithmic spirals, are horizontal and extend parallel to each other. The disk $S^1$ is shown in its zero position, while the disk $S^4$ is turned as far as it will go, and the disks $S^2$ and $S^3$ are in intermediate positions. As will be seen from the drawing the rotation of the disks results in their covering the slots $A^1$ to $A^4$ more and more. The rotation of the disks appears like a straight line motion in the slots, which latter may be provided with graduations that enable the corresponding levels to be read.

As shown in Fig. 1 the receivers will generally be moved into different positions by the transmitters located in various distant spots. These different movements appear from the different positions of the disks $S^1$ to $S^4$, which, by covering the slots to different extents, represent the various corresponding water levels.

In Fig. 2 a ruler L is shown which is arranged to slide up and down on the face of the receiver and enables the differences between any two levels to be easily discerned.

I claim:

1. In an indicating arrangement of the class described, a plurality of indicating devices, each indicating device including a rotatable, non-circular disk, a casing containing said indicating devices, said casing being provided with a plurality of spaced parallel slots cooperating with said non-circular disks, and a bar extending across said slots and adapted to slide on the face of said casing.

2. In an indicating device of the character described, a plurality of indicators, each indicator including a rotatable disk whose periphery forms an Archimedean curve, a casing for said indicators, said casing being provided with a plurality of spaced parallel slots cooperating with said rotatable disks, said disks when rotated appearing as if moved in a straight line relative to their associated slots, and a bar extending across said slots and slidable on the face of said casing, for the purpose described.

ROBERT HEINOLD.

Witnesses:
ARNEAS MARSELL,
EMIL LÜTT.